United States Patent
Keller et al.

(10) Patent No.: US 8,678,199 B2
(45) Date of Patent: Mar. 25, 2014

(54) FILTER FOR FLUIDS

(75) Inventors: Guido Keller, Hagen (DE); Dietmar Altegoer, Witten (DE); Dirk Trostmann, Wetter (DE)

(73) Assignee: Taprogge GmbH, Wetter (DE)

(*) Notice: Subject to any disclaimer, the term of this patent is extended or adjusted under 35 U.S.C. 154(b) by 738 days.

(21) Appl. No.: 12/440,311

(22) PCT Filed: Jan. 11, 2007

(86) PCT No.: PCT/EP2007/000210
§ 371 (c)(1),
(2), (4) Date: Apr. 13, 2009

(87) PCT Pub. No.: WO2008/083714
PCT Pub. Date: Jul. 17, 2008

(65) Prior Publication Data
US 2010/0038295 A1     Feb. 18, 2010

(51) Int. Cl.
*B01D 29/15*     (2006.01)
*B01D 29/68*     (2006.01)

(52) U.S. Cl.
USPC .................. 210/411; 210/170.09; 210/407

(58) Field of Classification Search
USPC ............................................. 210/407–415
See application file for complete search history.

(56) References Cited

U.S. PATENT DOCUMENTS

| | | | | |
|---|---|---|---|---|
| 4,085,051 A | * | 4/1978 | Kaminsky et al. | 210/333.01 |
| 5,192,429 A | * | 3/1993 | Bader | 210/170.09 |
| 5,667,683 A | * | 9/1997 | Benian | 210/409 |
| 6,358,290 B1 | | 3/2002 | Huttlin | |
| 6,499,727 B1 | * | 12/2002 | Sylvester | 261/92 |
| 6,508,933 B2 | | 1/2003 | Wilkins et al. | |
| 7,316,780 B1 | * | 1/2008 | Fendya et al. | 210/510.1 |
| 2003/0089653 A1 | * | 5/2003 | Scarano | 210/232 |

FOREIGN PATENT DOCUMENTS

| | | |
|---|---|---|
| DE | 3829360 A1 | 3/1990 |
| DE | 19819980 A1 | 11/1999 |
| WO | 2005/051809 A1 | 6/2005 |

OTHER PUBLICATIONS

International Preliminary Report on Patentability dated Jan. 11, 2007.

* cited by examiner

*Primary Examiner* — Tony G Soohoo
*Assistant Examiner* — Peter Keyworth
(74) *Attorney, Agent, or Firm* — Bachman & LaPointe, P.C.

(57) ABSTRACT

The invention relates to a filter for fluids, in particular water, having a filter surface and a rotary spray arm contained in said filter, said arm conducting a flushing medium against the filter surface. To achieve an increase in the throughput capacity of the filter and to improve the flushing of the filter surface, the filter is equipped with a fluid-proof drum motor, which drives at least one spray arm.

20 Claims, 4 Drawing Sheets

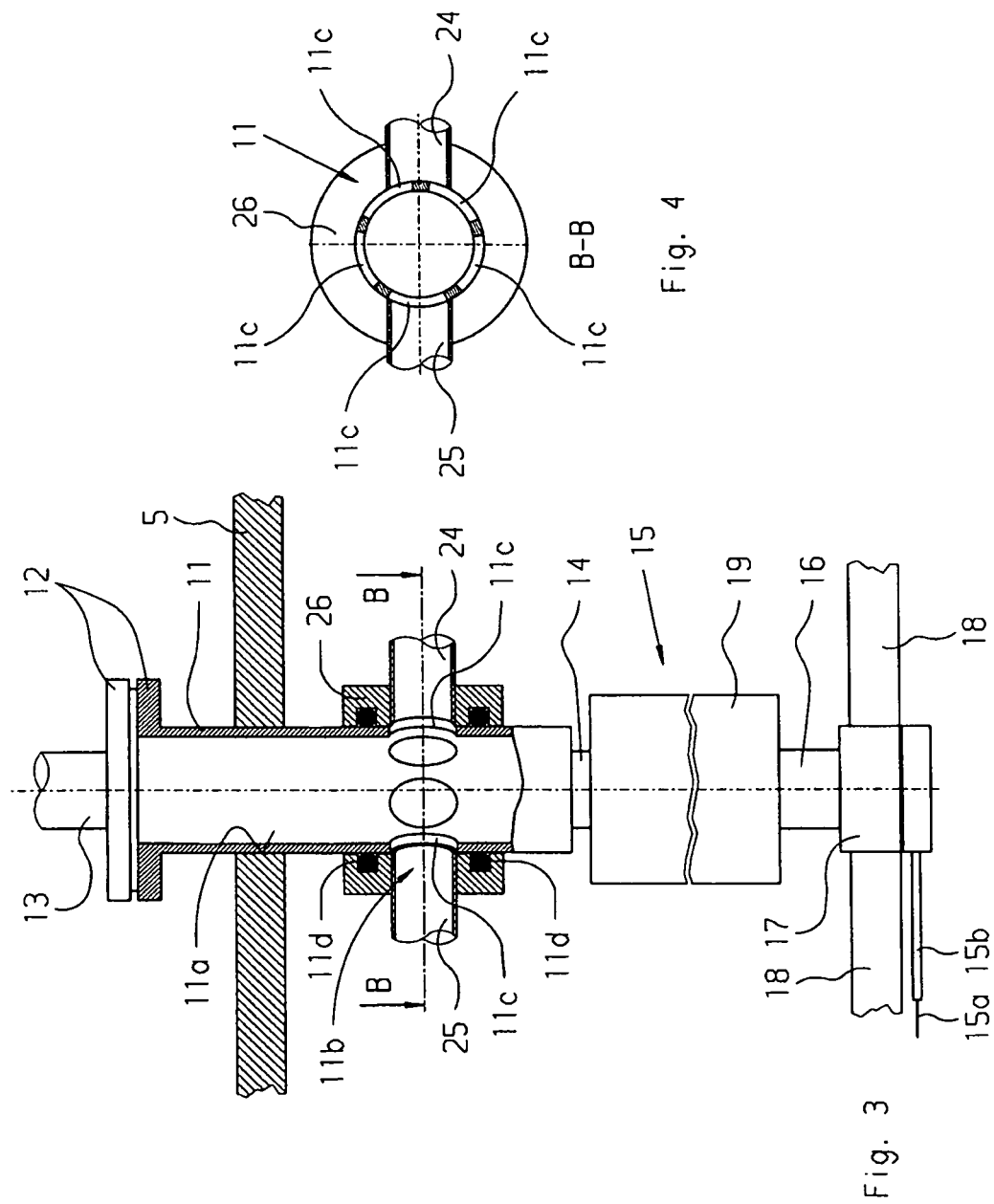

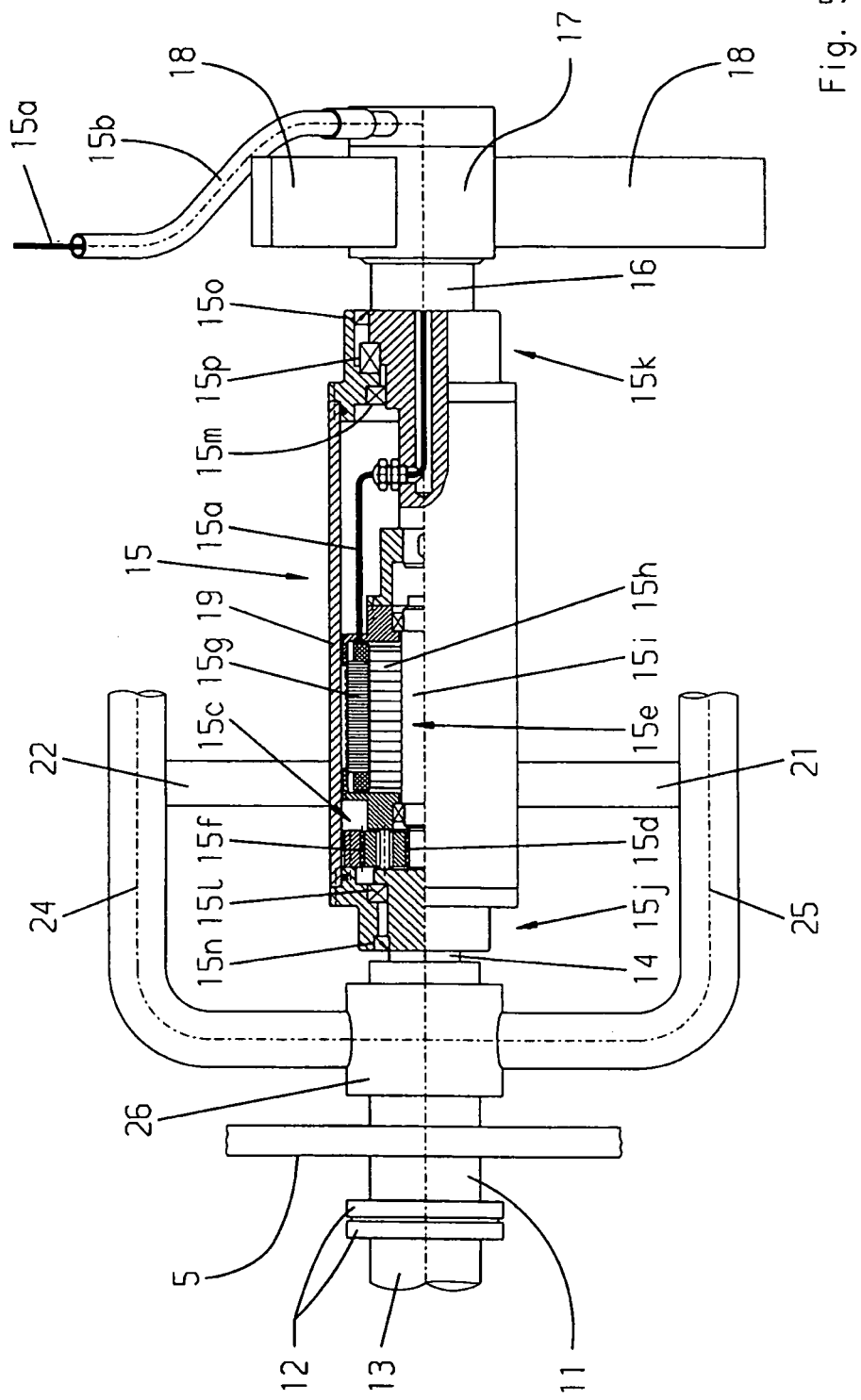

FILTER FOR FLUIDS

BACKGROUND (1) Field of the Invention

The invention relates to a filter for fluids, in particular water,
  comprising a filter surface and a rotary spray arm within the filter,
  for conducting a flushing medium against the filter surface.

The subject matter is primarily—but not exclusively—prescreens, which are arranged beneath a water surface on the suction side of a pump of a water intake.

(2) Prior Art

A filter of this type is disclosed in U.S. Pat. No. 6,508,933 B2. The filter consists of a cylindric side wall of plastic material closed at one side by a bottom, also of plastic material, and on the other side fully covered by a screen functioning as the filter surface. A spray arm equipped with nozzles is arranged in a rotary manner on a support centrally attached at the bottom of the filter. In the lower range of the filter, a tube provided with openings passes through the wall to the outside as an outlet for the water and is connected to the suction side of a pump. Pressurized water or pressurized air can be fed to the nozzles of the spray arm via a conduit, which passes through the side wall of the filter and through the support of the spray arm up to the latter. If the pump suction pressure is applied to the outlet tube, water from the surroundings is fed through the filter surface into the interior of the filter and from there, free of dirt is fed to the water system via the outlet and the pump. The filter surface is continuously cleaned of dirt deposited on the outside of the filter surface, by the rotary spray arm conducting flushing water or pressurized air fed via the pressured-water or pressurized-air conduit from the inside against the filter surface and thus removing the deposits.

The rotary movement is applied to the spray arm via an oblique position of the nozzles on the spray arm. By dividing the effect of the flushing medium for simultaneous use in driving and cleaning, the cleaning efficiency of the flushing medium jets is reduced. Moreover, by means of pressurized-water drive a rotary movement
  of the spray arm is only possible in the same sense of rotation, and continuously. Also, the filter surface is comparatively small in relation to the volume and the structural size of the filter.

SUMMARY OF THE INVENTION

It is therefore the object to create a powerful filter and achieve improved cleaning of the filter surface.

According to the present invention, the object is solved—based on the initially mentioned filter—by
  arranging a fluid-proof drum motor within the filter,
  for driving at least one spray arm; and
  the spray arm is attached on the drum of the drum motor.

The filter according to the present invention has a high efficiency because its entire cylindrical filter surface, if it is cylindrical, is available for water intake into the filter, and because at least one end of the filter is fully available as an outlet opening. The fluid-proof drum motor can be arranged in a space-saving manner due to its slim structure as a drive of the rotary spray arm, the rotary movement of which essentially, and at least partially, corresponds to the form of the filter surface. A closed cover of the filter for receiving a support for one end of the drum motor and the inlet of the flushing medium, preferably pressurized air or pressurized water, can be opposed to an outlet opening, while the other end of the drum motor can be fixed in the area of the opposed outlet opening.

The filter can be of steel, concrete or plastic material.

Drum motors are well known driving elements in conveying technology. The roller bearings used in the drum motors are usually configured for receiving radial loads, such as tensile belt forces in conveyer drives. If a drum motor is used for the filter according to the present invention, it is suitable to use a standard drum motor with an additional axial bearing, as necessary. Fluid-proof in the use of the drum motor according to the present invention preferably means a seawater-proof stainless steel structure for all parts contacting the medium and a reinforced proofing of the motor against water entry. The drive of the spray arm by the drum motor affords the designer various design options for the form of the filter and the form and arrangement of the spray arm and its rotary movement by means of suitable motor control.

Preferably the filter has a closed side surface at least partially formed as a filter surface (claim 2). It is therefore clear that the present invention is suitable for all filters—irrespective of their cross-sectional or longitudinal form—as long as they have a closed interior space and their side surfaces are at least partially formed as filter surfaces. This means that filters having interruptions in the filter surface or other, possibly closed surfaces between the filter surfaces, are also covered by an embodiment of the present invention.

As far as the shape of the filter is concerned, it is preferred if the filter has a filter element annular or regularly or irregularly polygonal in cross section and/or cylindrical or frusto-conical in longitudinal section (claim 3). This means that a filter element of the filter may be annular in cross section, i.e. circular or annular having a shape deviating from the circular, e.g. oval shaped with semicircular or at least quarter-circular ends. This enables reciprocating motion in terms of a wiper movement of the spray arm to conduct the flushing medium against the filter surface. In the case of filter elements oval shaped in cross section, for example with semicircular ends, both rotary movements coordinated with each other, and wiper movements of at least two spray arms provided for this purpose, are suitable. The polygonal shape covers all filter surface forms angular in cross section. The form of the filter element in longitudinal section can also have various shapes, wherein cylindrical or frusto-conical filter elements are only mentioned as preferred shapes.

Filter elements with the form of circular segments in cross section are also possible (claim 4). In this case, the flushing medium can be applied in a wiper movement, for example, of the spray arm and the nozzle onto the filter element having a circular segment form in cross section.

A further development of the invention is characterized in that the filter has continuous filter surface portions in cross section (claim 5). In this case the filter surface is comprised of plural or a plurality of individual filter surfaces, irrespective of whether they are cylindrical, for example, or whether they are a regularly or irregularly polygonal filter surfaces. Herein, the filter surface sections can be composed of sections, for example, such as semicircular segments. The annular filter surface portions or segments can serve as a filter surfaces themselves or a support structure for receiving filter surfaces. Such subdivisions may be suitable in cases where the size and/or the weight would make a subdivision, such as for transport or assembly of the filter, appear suitable.

According to an essential embodiment of the invention it is possible for the filter to comprise filter elements stacked one above the other (claim 6). This enables at least two filter elements, for example, to be stacked upon each other and fixed with respect to each other, which have a common drum motor. The formation of a filter of a plurality of filter elements stacked one upon the other, enables the creation of a filter unit with a correspondingly high throughput of filtered water. A filter of two, three or more filter elements enables a modular construction, without the need for designing and manufacturing filter elements with a great structural height. Even if the filter height is increased, a single drum motor can be used for the rotary drive of a plurality of flushing arms used in a stacked configuration by choosing a drum motor of corresponding length and with end adapters of corresponding length.

It is preferred if the filter has fixtures for attaching the drum motor (claim 7). There are various possibilities of configuring the fixtures as a connection between the filter and the drum motor.

According to the present invention it is provided that the spray arm is fixed on the drum of the drum motor. By directly attaching the spray arm on the drum of the motor an extra rotary support of the spray arm can be omitted, because the drum of the drum motor causes the rotary movement of the spray arm and is at the same time the carrier of the spray arm. There are various design options for this attachment of the spray arm, because the entire length of the drum of the motor is available for this purpose. For this reason various shapes and attachment locations are possible for the spray arm. Apart from attaching the spray arm on the drum of the motor, however, the spray arm can also have an additional rotary support on the filter.

Also for this reason it is preferred, if the spray arm driven by the drum motor is rotatably supported on the filter (claim 8). In this case the motor applies the rotary movement to the spray arm via a direct connection between the drum and the spray arm, or via the interposition of further torque-transmitting elements, while the spray arm is rotatably supported on the filter.

A further development of the invention is characterized in that the filter comprised of one or more filter elements has at least two spray arms rotating at the same height as the filter element or arranged on top of each other—as seen in the direction of the axis of rotation—and driven by the same drum motor, or separately driven by at least two drum motors (claim 9). This further development considers both filters consisting of a plurality of stacked filter elements and filters requiring more than one spray arm due to their size and/or cross-sectional shape. This is how the determination of the number of spray arms required and their arrangement may be adapted, in view of the selected filter form in terms of its longitudinal or cross-sectional shape, beyond the most simple case, where only one spray arm is needed per filter element, having a cylindrical shape, for example. Two spray arms may for example rotate side-by-side in a trough-shaped filter having semicircular filter ends, for example, and, if they are driven by the same drum motor, they can have a corresponding drive connection. Basically, according to this further development, the drum motor, in a filter consisting of two filter elements, for example, can carry either only one spray arm with at least one nozzle for the filter surfaces of the two filter elements, or can carry a plurality of preferably two spray arms, each associated with one of the two filter elements. It can also be advantageous if more than one spray arm rotates at the same height in the filter, in particular if a great amount of dirt is to be expected on the filter surface.

It is preferred if the drum motor is coaxially arranged in the filter (claim 10), wherein suitably the end of the drum motor is attached in a support in the area of the outlet opening and the other end in the area of the closed end of the filter, i.e. for example in the area of the cover of the filter (claim 11). This arrangement and manner of attachment for the drum motor within the filter illustrates the simple and space-saving way of mounting the drum motor in the filter.

According to a further development of the invention, a supply tube for the flushing medium, to which a connection of the flushing arm is rotatably connected through a rotary passage, is arranged at the closed end of the filter, i.e. at the cover plate (claim 12). By means of this arrangement, the supply of the pressurized water or pressurized air to the flushing arm is configured in a simple manner, namely by a tube passing through the cover and attached there, and by a sleeve rotatably supported on the tube as a connection to the flushing arm and provided with a rotary passage. At the same time, the inner tube end suitably receives one end of the drum motor, so that a separate mounting on the filter itself is not necessary.

Suitably the spray arm carries at least one nozzle on its free end, the opening of which is directed towards the inside of the filter surface and is at a short distance to the latter (claim 13). In contrast to the initially described prior-art approach for a filter of this type, a nozzle on the free end of the spray arm configured and arranged according to the present invention can achieve a high flushing efficiency because the pressurized flushing liquid or pressurized flushing air only presses the water present in the area of the inside of the filter surface back through the filter surface for releasing and removing deposits from the outside of the filter surface and does not need to drive for instance also the spray arm. If polygonal filter surfaces, such as a plurality of planar filter segments, are used, a good cleaning effect may be achieved in an analogous fashion.

Preferably the length of the nozzle essentially corresponds to the height of the filter surface (claim 14). Such an embodiment is more efficient than the arrangement of individual nozzles as in the initially-mentioned well known structure. The opening of the nozzle can be configured in a continuous manner or subdivided into opening sections (claim 15).

Preferably the cross-sectional shape of the nozzle, in particular the form of the nozzle opening is matched to the curvature of the filter surface (claim 16). This results in uniform pressure of the flushing water on the filter surface.

The width of the nozzle should correspond to the circumferential section of the cylindrical filter surface of 5-90°, preferably of 10-40° (claim 17). The selection of the nozzle size depends on the amount of dirt and the type of dirt as well as other factors, such as the selection of the type of rotation of the nozzles—continuous or discontinuous in a predetermined manner.

According to a further development of the invention, the filter surface has webs on its inner surface parallel to its longitudinal center axis, with which the inner surface of the filter is subdivided into chambers, the circumferential section of which essentially corresponds to the width of the nozzle openings (claim 18). If one of these chambers is covered by a nozzle opening, the pressurized flushing water exiting from the nozzle opening is almost completely guided onto the filter surface on the side of the chamber, without evading to the side, so that a particularly high flushing efficiency is achieved.

A further development of the invention is characterized by a control of the drum motor with which the sense of rotation of the drum motor and the spray arm is reversed after a predetermined rotary motion of 180°, for example, or if the continuation of the rotary motion of the spray arm is blocked by an obstruction (claim 19).

It is preferred if the filter is connected with the suction side of a pump via a conduit or directly (claim 20). It is only essential that a suction is created within the filter with which influx of the water is caused through the filter surface into the interior of the filter.

BRIEF DESCRIPTION OF THE DRAWINGS

An exemplary embodiment of the invention will be described in more detail in the following with reference to the drawings, wherein:

FIG. 3 is a partial sectional view of a detail of the filter in the area of a rotary passage;

FIG. 4 is a sectional view of FIG. 3 along sectional line B-B of FIG. 3; and

FIG. 5 is a partial sectional view of a drum motor with spray arms attached thereto.

DETAILED DESCRIPTION OF THE PREFERRED EMBODIMENT(S)

Figure 1:
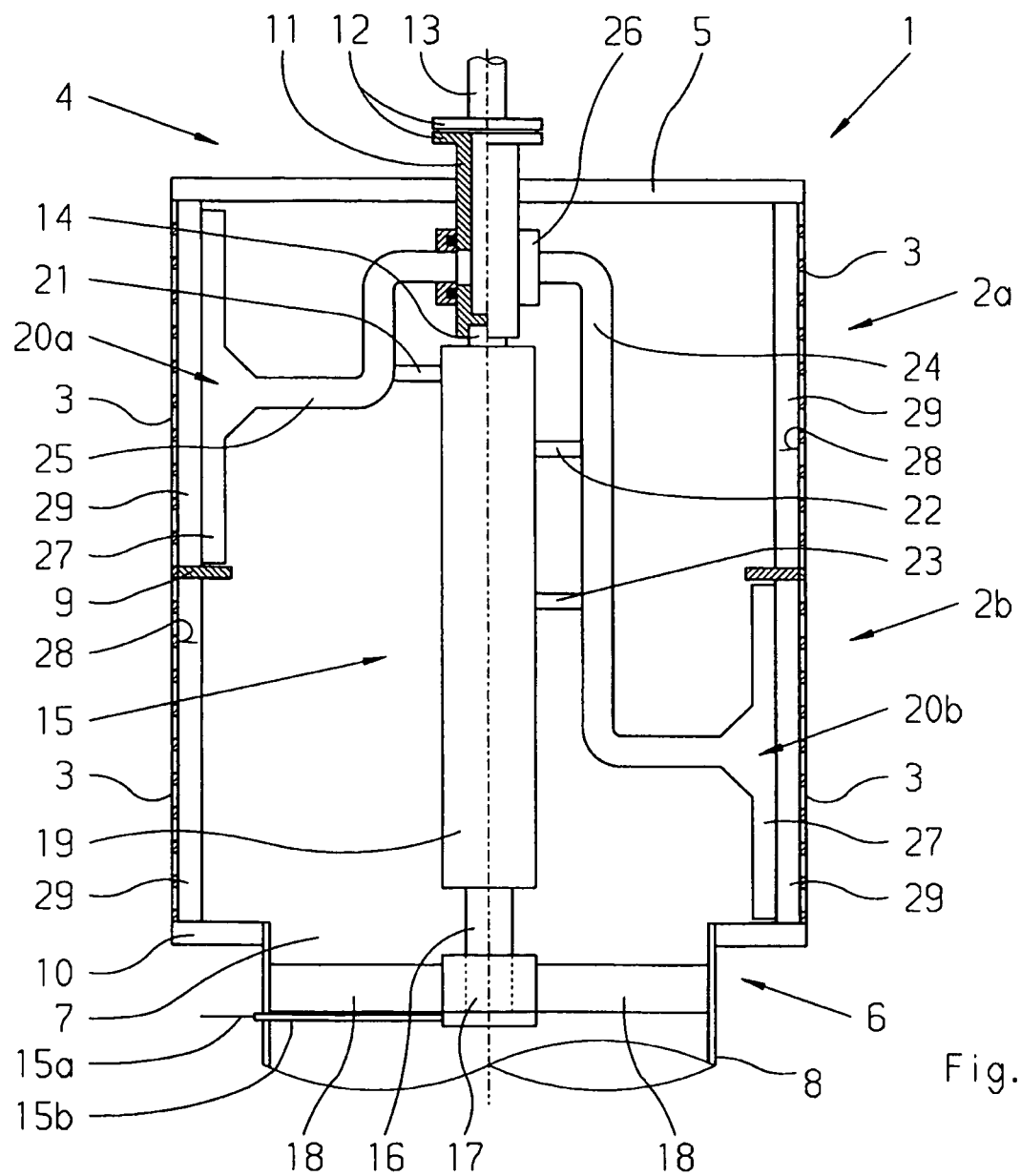
FIG. 1 is a longitudinal sectional view of a filter consisting of two filter elements arranged on top of each other.

With reference to FIG. 1, a filter 1 is shown consisting of two filter elements 2a, 2b arranged on top of each other. Each of filter elements 2a, 2b has a cylindrical filter surface 3. One end 4 of filter element 2a is closed off by a cover 5, while another end 6 of filter element 2b has an outlet opening 7, to which a conduit 8 is attached. Between filter elements 2a, 2b, there is an annular stiffening 9, while filter element 2b has an annular bottom 10 in the area of the other end 6, from which conduit 8 extends. The filter components can be of steel sheeting, concrete or plastic material.

A tube 11 extends through an opening 11a in cover 5 of filter element 2a and is fixed to cover 5. A conduit 13 for a flushing medium, such as pressurized water or pressurized air, is connected to tube 11 by means of a flange connection 12.

Figure 2:
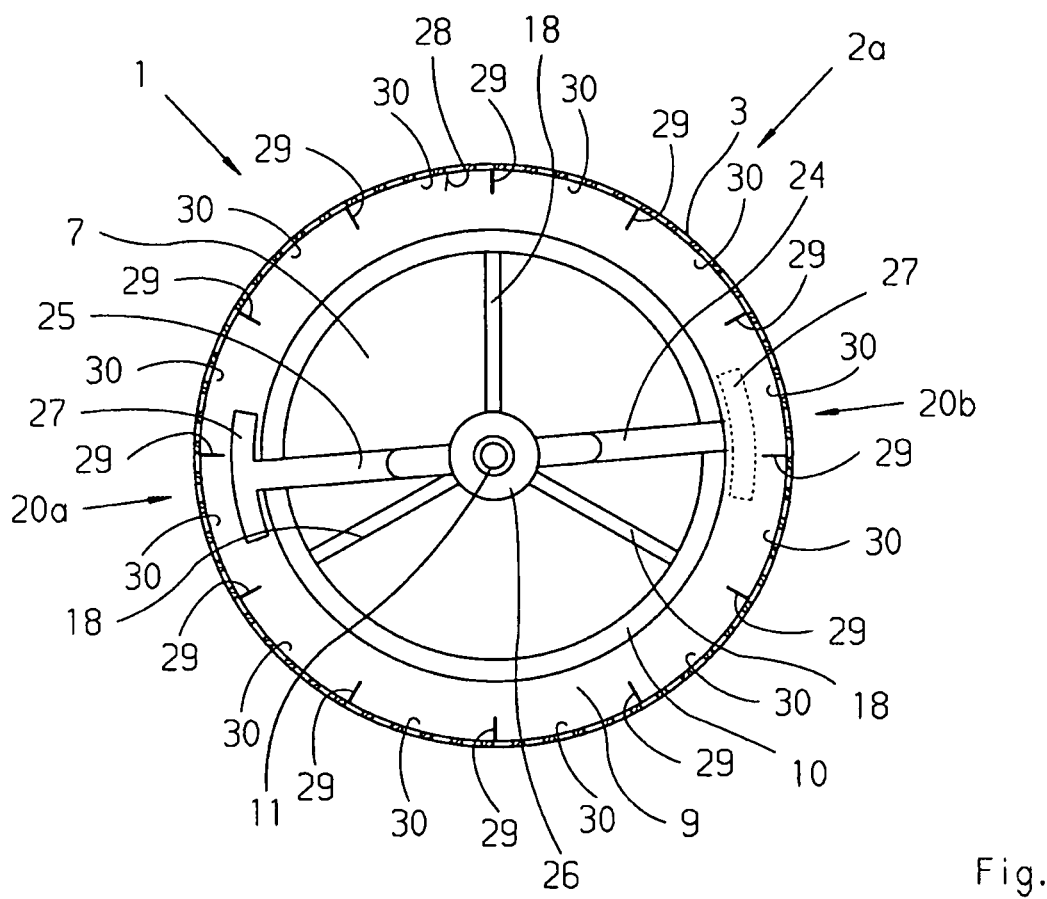
FIG. 2 is a plan view of the filter of FIG. 1 in section along line A-A of FIG. 1.

One end 14 of a drum motor 15 coaxially arranged within filter 1 is connected to the inner end of tube 11, while the other end 16 of the motor is fixed in a sleeve 17, which is attached in the front end of conduit 8 by means of radial struts 18 (c.f. also FIG. 2). The current supply of drum motor 15 is taken care of by a cable 15a extending through the wall of conduit 8 and guided by a protective tube 15b on one of radial struts 18 and via the other end 16 of drum motor 15 to the latter (c.f. also FIGS. 3 and 5).

Drum motor 15 is known in its basic structure, for example, from WO 2005/051809 A1 ("Motorized Drum Roller with Fixed Ends"). All components coming into contact with the fluid of drum motor 15 are of seawater-proof material, for example stainless steel, such as 1.4462 or 1.4439. An axial bearing 15p can also be provided adjacent to the end 16 of drum motor 15 to receive axial forces as they arise in the use of drum motor 15 as a drive of spray arms 20a, 20b.

Components of drum motor 15, such as reduction gearbox 15c between pinion 15d of electric motor 15e and inner toothing 15f of drum 19, and ends 14, 16, of drum motor 15 are configured for the use of drum motor 15 as a rotary drive of spray arms 20a, 20b. The windings of stator 15g are connected to cable 15a. A rotor 15h has a rotor shaft 15i with pinion 15d. Reduction gearbox 15c is in mesh with pinion 15d for rotatively driving drum 19 via its inner toothing 15f. Ends 15j, 15k of drum 19 have rotary bearings 15l, 15m as well as fluid-proof gaskets 15n, 15o. Axial bearing 15p is shown on end 15k.

Spray arm 20a for filter 2a is attached on drum 19 of drum motor 15 by means of a strut 21, and spray arm 20b for filter 2b is attached by means of struts 22, 23 (c.f. FIG. 1). Conduits 24, 25 of spray arms 20a, 20b extend from a sleeve 26 rotatively supported on tube 11 by means of a rotary passage 11b, shown in detail in FIGS. 3 and 4. In the area of the open ends of conduits 24, 25, tube 11 has circumferentially spaced openings 11c for the passage of pressurized water or pressurized air. Combined with O-rings 11d in a seawater-proof and anti-twist configuration, sleeve 26 forms a rotatable and fluid-proof connection of conduits 24 and 25 on tube 11.

Spray arms 20a, 20b, at the ends of their conduits 24, 25, have nozzles 27 curved in cross section, the lengths of which each essentially correspond to the height of filters 2a, 2b, and have openings directly facing the inside 28 of filter surface 3 at a small distance (c.f. FIGS. 1 and 2). Through conducting means (not shown) within nozzles 27, pressurized water or pressurized air supplied via conduit 13, tube 11 and conduits 24, 25 for the purposes of flushing the inside 28 of filter surface 3 is uniformly distributed across the height or length and width of nozzle 27.

Parallel webs 29 (only indicated by radial lines on the inside 28 of filter surface 3 in FIG. 2) for forming chambers 30 are arranged in a uniformly distributed manner on the circumference of inside 28 of filter surface 3 parallel to the longitudinal center axis of filter 1. The width and height of chambers 30 essentially corresponds to the openings, i.e. the open outsides of nozzles 27, so that chambers 30 open toward the inside are each essentially covered by nozzles 27 if nozzles 27 face chambers 30.

If filter 1 is installed at the water-intake site and conduit 8 is connected to outlet opening 7 in the same way as conduit 13 is connected for supplying pressurized water, water intake can begin, as soon as the pump (not shown) arranged on the suction side in conduit 8 is energized. Then water flows through cylindrical filter surface 3 into filter elements 2a, 2b and from there via outlet opening 7 into conduit 8. In the process, water is filtered, i.e. dirt particulate is filtered out from the water and deposited on the outside of filter surface 3, as far as it is not carried away from filter surface 3 by other influences.

As soon as the amount of dirt on filter surface 3 has reached a predetermined value, drum motor 15 is energized so that spray arms 20a, 20b are caused to rotate for the purpose of cleaning filter surface 3. Energizing drum motor 15 also causes the supply of pressurized water via conduit 13, tube 11 and conduits 24, 25 to begin to nozzles 27. Pressurized water or pressurized air exiting from the opening of each nozzle 27 causes backflushing of filter surface 3, i.e. water on the inside 28 of filter surface 3 is pressed back through filter surface 3 by pressurized water, and thus dirt deposited on the outside of filter surface 3 is released and removed.

The control of drum motor 15 and pressurized-water conduction can also be adjusted in such a way that spray arms 20a, 20b are either rotated continuously, i.e. irrespective of the amount of dirt on filter surface 3, or are rotated discontinuously with rest periods, during which nozzles 27, each essentially covering chambers 30, stand in front of them. Other control systems, not mentioned here are also possible. The same applies to the selection of the flushing medium and pressure control for supplying the flushing medium via conduit 13. Possible variations in the structure of filter 1 have already been mentioned in the first portion of the description.

The invention claimed is:

1. A filter for fluids comprising:
a filter surface and at least one rotatable spray arm within the filter for conducting a flushing medium against the filter surface;
a fluid-proof drum motor arranged within the filter for driving said at least one spray arm;
said drum motor extending inside the filter surface;
the at least one spray arm being attached to a drum of the drum motor; and
the filter being configured to be submerged beneath a water surface.

2. The filter according to claim 1, further comprising a closed side surface at least partially comprising the filter surface.

3. The filter according to claim 1, further comprising a filter element which is annular or regularly polygonal or irregularly polygonal in cross section and/or cylindrical or frusto-conical in longitudinal section.

4. The filter according to claim 1, further comprising at least one filter element having a circular segment shape in cross section.

5. The filter according to claim 1, further comprising the filter having filter surface portions continuous in cross section.

6. The filter according to claim 1, wherein the filter has filter elements stacked on top of each other.

7. The filter according to claim 1, further comprising fixtures for attaching the drum motor.

8. The filter according to claim 1, wherein at least one spray arm driven by the drum motor is rotatably supported on the filter.

9. The filter according to claim 1, wherein the filter is comprised of at least one filter element having at least two spray arms, rotating at the same height as the at least one filter element, or arranged one above the other and driven by the same drum motor or separately driven by at least two drum motors.

10. The filter according to claim 1, wherein the drum motor is arranged coaxial with the filter.

11. The filter according to claim 1, wherein one end of the drum motor is attached in a fixture in an area of an outlet opening and another end of the drum motor is attached in an area of a closed end of the filter.

12. The filter according to claim 11, wherein at the closed end of the filter, a tube for the flushing medium is arranged, with which a connection of the at least one spray arm is rotatably connected through a rotary passage.

13. The filter according to claim 1, wherein the at least one spray arm carries at least one nozzle on a free end, the said at least one nozzle having an opening which is directed toward an inside of the filter surface and is at a short distance to the filter surface.

14. The filter according to claim 13, wherein the at least one nozzle has a length which essentially corresponds to a height of the filter surface.

15. The filter according to claim 13, wherein a form of the nozzle opening, is matched to a curvature of the filter surface.

16. The filter according to claim 13, wherein a width of the at least one nozzle corresponds to a circumferential section of a cylindrical filter surface of 5-90°.

17. The filter according to claim 15, wherein the width of the at least one nozzle corresponds to a circumferential section of the cylindrical filter surface of 10-40°.

18. The filter according to claim 16, wherein the filter surface has webs at its inner surface parallel to a longitudinal center axis of the filter for subdividing the inner surface of the filter surface into chambers, the circumferential section of which essentially corresponds to the width of the nozzle openings.

19. The filter according to claim 1, wherein the drum motor is configured for reversing rotation of the drum motor and the at least one spray arm after a predetermined rotary motion of 180° or if the continuation of the rotary motion is blocked by an obstruction.

20. The filter according to claim 1, wherein the filter is connected to a suction side of a pump via a conduit or directly.

* * * * *